(12) United States Patent
Shen et al.

(10) Patent No.: US 12,445,734 B2
(45) Date of Patent: Oct. 14, 2025

(54) METHOD AND APPARATUS FOR GENERATING HIGH-DYNAMIC-RANGE IMAGE, AND ELECTRONIC DEVICE

(71) Applicant: Rockchip Electronics Co., Ltd., Fuzhou (CN)

(72) Inventors: Yanxin Shen, Fuzhou (CN); Ning Luo, Fuzhou (CN); Huimin Song, Fuzhou (CN)

(73) Assignee: Rockchip Electronics Co., Ltd., Fujian (CN)

( * ) Notice: Subject to any disclaimer, the term of this patent is extended or adjusted under 35 U.S.C. 154(b) by 179 days.

(21) Appl. No.: 18/386,617

(22) Filed: Nov. 3, 2023

(65) Prior Publication Data
US 2024/0155248 A1 May 9, 2024

(30) Foreign Application Priority Data
Nov. 7, 2022 (CN) .......................... 202211386752.7

(51) Int. Cl.
*H04N 23/73* (2023.01)
*H04N 23/11* (2023.01)
*H04N 23/71* (2023.01)
*H04N 23/741* (2023.01)

(52) U.S. Cl.
CPC .......... *H04N 23/73* (2023.01); *H04N 23/741* (2023.01)

(58) Field of Classification Search
CPC ...... H04N 23/73; H04N 23/741; H04N 23/11; H04N 23/71
See application file for complete search history.

(56) References Cited

U.S. PATENT DOCUMENTS

| 11,252,345 B2* | 2/2022 | Sun ........................ H04N 23/54 |
| 11,689,822 B2* | 6/2023 | Peng ....................... G06V 40/16 |
| | | 348/164 |
| 11,877,070 B2* | 1/2024 | Steiner ................. A61B 1/0005 |

OTHER PUBLICATIONS

MultiSpectral Bilateral Video Fusion (Year: 2007).*

* cited by examiner

*Primary Examiner* — Ahmed A Berhan
(74) *Attorney, Agent, or Firm* — IPRTOP LLC

(57) ABSTRACT

A method and apparatus for generating a high-dynamic-range image, storage medium, and electronic device are provided. The method comprises: obtaining a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, and bright regions of the short-exposure visible-light image are not overexposed; performing brightness reconstruction on an overexposed region of the long-exposure visible-light image based on the long-exposure near-infrared image, the short-exposure visible-light image, and the short-exposure near-infrared image; performing chromaticity reconstruction on the overexposed region of the long-exposure visible-light image based on the short-exposure visible-light image; and generating the high-dynamic-range image based on the long-exposure visible-light image, and results of the brightness reconstruction and the chromaticity reconstruction for the long-exposure visible-light image. In the obtained high-dynamic-range image, both bright and dark regions can be clearly imaged without ghosting.

20 Claims, 7 Drawing Sheets

METHOD AND APPARATUS FOR GENERATING HIGH-DYNAMIC-RANGE IMAGE, AND ELECTRONIC DEVICE

CROSS REFERENCE TO RELATED APPLICATION

The present application claims the benefit of priority to Chinese Patent Application No. CN 202211386752.7, entitled "METHOD AND APPARATUS FOR GENERATING HIGH-DYNAMIC-RANGE IMAGE, STORAGE MEDIUM, AND ELECTRONIC DEVICE", filed with CNIPA on Nov. 7, 2022, the disclosure of which is incorporated herein by reference in its entirety for all purposes.

FIELD OF THE INVENTION

The present disclosure generally relates to image generating methods, and in particular to a method and an apparatus for generating a high-dynamic-range image, and an electronic device.

BACKGROUND OF THE INVENTION

High Dynamic Range, or HDR, is a technology used to create images that have a high level of realism, which is achieved by blending images using computer algorithms. This technology is widely utilized in various fields such as computer game development, medical imaging, remote sensing image processing, and computer graphics. The term "dynamic range" in this context refers to the ratio between the maximum and minimum brightness values in an image. A larger dynamic range means that the image can display more details of the scene, resulting in a more realistic visual effect. In traditional imaging, a pixel's brightness is stored in an 8-bit space, which means there are only 256 levels of brightness. This often falls short in situations where a high level of detail is required. In contrast, high-dynamic-range images use multiple bytes of floating-point numbers to store the brightness value of a pixel. This allows for a comprehensive representation of the high dynamic range found in natural scenes.

SUMMARY OF THE INVENTION

The present disclosure provides a method and an apparatus for generating a high-dynamic-range image, a storage medium, and an electronic device, which are capable of generating clear high-dynamic-range images.

A first aspect of the present disclosure provides a method for generating a high-dynamic-range image, comprising: obtaining a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, wherein bright regions of the short-exposure visible-light image are not overexposed, the long-exposure visible-light image and the long-exposure near-infrared image spatially correspond to each other, wherein the short-exposure visible-light image and the short-exposure near-infrared image spatially correspond to each other; performing brightness reconstruction on an overexposed region of the long-exposure visible-light image based on the long-exposure near-infrared image, the short-exposure visible-light image, and the short-exposure near-infrared image; performing chromaticity reconstruction on the overexposed region of the long-exposure visible-light image based on the short-exposure visible-light image; and generating the high-dynamic-range image based on the long-exposure visible-light image, and results of the brightness reconstruction and the chromaticity reconstruction for the long-exposure visible-light image.

In one embodiment of the first aspect, performing brightness reconstruction on an overexposed region of the long-exposure visible-light image based on the long-exposure near-infrared image, the short-exposure visible-light image, and the short-exposure near-infrared image comprises: obtaining a mapping relationship between brightness of the short-exposure visible-light image and near-infrared intensity of the short-exposure near-infrared image as a first mapping relationship; obtaining a spatial matching relationship between the long-exposure near-infrared image and the short-exposure near-infrared image; obtaining an image block correspondence between the long-exposure visible-light image and the short-exposure visible-light image as a second mapping relationship, based on the spatial matching relationship between the long-exposure near-infrared image and the short-exposure near-infrared image; obtaining a mapping relationship between brightness of the long-exposure visible-light image and near-infrared intensity of the long-exposure near-infrared image as a third mapping relationship, based on the first mapping relationship and the second mapping relationship; and reconstructing brightness of the overexposed region of the long-exposure visible-light image based on the third mapping relationship and the near-infrared intensity of the long-exposure near-infrared image.

In one embodiment of the first aspect, reconstructing the brightness of the overexposed region of the long-exposure visible-light image comprises: mapping a gradient of an overexposed region of the long-exposure near-infrared image to a gradient of the overexposed region of the long-exposure visible-light image according to the third mapping relationship, wherein the overexposed region of the long-exposure near-infrared image corresponds to the overexposed region of the long-exposure visible-light image; obtaining an overall gradient of the long-exposure visible-light image based on the gradient of the overexposed region of the long-exposure visible-light image and a gradient of a non-overexposed region of the long-exposure visible-light image; and reconstructing the brightness of the overexposed region of the long-exposure visible-light image based on the overall gradient of the long-exposure visible-light image.

In one embodiment of the first aspect, obtaining a mapping relationship between brightness of the short-exposure visible-light image and near-infrared intensity of the short-exposure near-infrared image as a first mapping relationship comprises: dividing a short-exposure scene into a plurality of regions based on the short-exposure visible-light image and the short-exposure near-infrared image; and obtaining, for each one of the plurality of regions, the first mapping relationship of the region based on the brightness of the short-exposure visible-light image of the region and the near-infrared intensity of the short-exposure near-infrared image of the region.

In one embodiment of the first aspect, for each one of the plurality of regions, the first mapping relationship corresponding to the region is given by: $V = a \times N + b$, wherein $V$ denotes visible-light brightness of a pixel in the region, $N$ denotes near-infrared intensity of the pixel in the region, $a$ and $b$ are mapping parameters dependent on $V$ and $N$.

In one embodiment of the first aspect, for each one of the plurality of regions, the first mapping relationship corresponding to the region is given by: $V = a \times N$, wherein $V$ denotes visible-light brightness of a pixel in the region, N denotes near-infrared intensity of the pixel in the region, and a is a mapping parameter, and wherein the mapping parameter is dependent on V and N.

In one embodiment of the first aspect, dividing a short-exposure scene into a plurality of regions comprises: dividing each channel of the short-exposure visible-light image to obtain a first division result; dividing the short-exposure near-infrared image to obtain a second division result; and obtaining a combined division result of the short-exposure scene based on the first division result and the second division result.

In one embodiment of the first aspect, dividing each channel of the short-exposure visible-light image comprises: obtaining a multilevel grayscale histogram of each channel of the short-exposure visible-light image; and obtaining grayscale peaks of the multilevel grayscale histogram of the channel, and dividing pixels of the channel using valleys between adjacent grayscale peaks as division boundaries.

In one embodiment of the first aspect, performing chromaticity reconstruction on an overexposed region of the long-exposure visible-light image based on the short-exposure visible-light image comprises: obtaining a block of the short-exposure visible-light image corresponding to the overexposed region of the long-exposure visible-light image; and performing the chromaticity reconstruction on the overexposed region of the long-exposure visible-light image based on chromaticity of the block of the short-exposure visible-light image.

In one embodiment of the first aspect, obtaining the long-exposure visible-light image, the long-exposure near-infrared image, the short-exposure visible-light image, and the short-exposure near-infrared image comprises: obtaining a long-exposure raw image file and a short-exposure raw image file, wherein the long-exposure raw image file and the short-exposure raw image file are acquired by an image acquisition device using different exposure parameters for the target scene; and demosaicing the long-exposure raw image file to obtain the long-exposure visible-light image and the long-exposure near-infrared image, and demosaicing the short-exposure raw image file to obtain the short-exposure visible-light image and the short-exposure near-infrared image.

In one embodiment of the first aspect, the method for generating the high-dynamic-range image further comprises: adjusting the exposure parameters of the image acquisition device so that the short-exposure visible-light image and the long-exposure near-infrared image are not overexposed, and so that the bright regions of the short-exposure visible-light image are not overexposed.

In one embodiment of the first aspect, the short-exposure near-infrared image and the long-exposure near-infrared image are not overexposed, such that information of most regions of the short-exposure near-infrared image and most regions of the long-exposure near-infrared image is capable of being captured and such that near-infrared image information of regions of the short-exposure near-infrared image and the long-exposure near-infrared image corresponding to the overexposed region of the long-exposure visible-light image is retained; the bright regions of the short-exposure visible-light image are not overexposed such that brightness information and chromaticity information of the bright regions are retained.

In one embodiment of the first aspect, the long-exposure visible-light image has a same spatial relationship with the long-exposure near-infrared image, and wherein the short-exposure visible-light image has a same spatial relationship with the short-exposure near-infrared image.

A second aspect of the present disclosure provides an apparatus for generating a high-dynamic-range image, comprising: an image acquisition module, configured to obtain a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, wherein bright regions of the short-exposure visible-light image are not overexposed, the long-exposure visible-light image and the long-exposure near-infrared image spatially correspond to each other, wherein the short-exposure visible-light image and the short-exposure near-infrared image spatially correspond to each other; a brightness reconstruction module, configured to perform brightness reconstruction on an overexposed region of the long-exposure visible-light image based on the long-exposure near-infrared image, the short-exposure visible-light image, and the short-exposure near-infrared image; a chromaticity reconstruction module, configured to perform chromaticity reconstruction on the overexposed region of the long-exposure visible-light image based on the short-exposure visible-light image; and an image reconstruction module, configured to generate the high-dynamic-range image based on the long-exposure visible-light image, and results of the brightness reconstruction and the chromaticity reconstruction for the long-exposure visible-light image.

In one embodiment of the second aspect, the brightness reconstruction module is configured to: obtain a mapping relationship between brightness of the short-exposure visible-light image and near-infrared intensity of the short-exposure near-infrared image as a first mapping relationship; obtain a spatial matching relationship between the long-exposure near-infrared image and the short-exposure near-infrared image; obtain an image block correspondence between the long-exposure visible-light image and the short-exposure visible-light image as a second mapping relationship, based on the spatial matching relationship between the long-exposure near-infrared image and the short-exposure near-infrared image; obtain a mapping relationship between brightness of the long-exposure visible-light image and near-infrared intensity of the long-exposure near-infrared image as a third mapping relationship, based on the first mapping relationship and the second mapping relationship; and reconstruct brightness of the overexposed region of the long-exposure visible-light image based on the third mapping relationship and the near-infrared intensity of the long-exposure near-infrared image.

In one embodiment of the second aspect, the chromaticity reconstruction module is configured to: obtain a block of the short-exposure visible-light image corresponding to the overexposed region of the long-exposure visible-light image; and perform the chromaticity reconstruction on the overexposed region of the long-exposure visible-light image based on chromaticity of the block of the short-exposure visible-light image.

In one embodiment of the second aspect, the image acquisition module is configured to: obtain a long-exposure raw image file and a short-exposure raw image file, wherein the long-exposure raw image file and the short-exposure raw image file are acquired by an image acquisition device using different exposure parameters for the target scene; and perform a demosaic on the long-exposure raw image file to obtain the long-exposure visible-light image and the long-exposure near-infrared image, and perform a demosaic on the short-exposure raw image file to obtain the short-exposure visible-light image and the short-exposure near-infrared image.

In one embodiment of the second aspect, the image acquisition module is further configured to: adjust the exposure parameters of the image acquisition device so that the short-exposure visible-light image and the long-exposure near-infrared image are not overexposed, and so that the bright regions of the short-exposure visible-light image are not overexposed, wherein the short-exposure near-infrared image and the long-exposure near-infrared image are not overexposed, such that information of most regions of the short-exposure near-infrared image and most regions of the long-exposure near-infrared image is capable of being captured, and such that near-infrared image information of regions of the short-exposure near-infrared image and the long-exposure near-infrared image corresponding to the overexposed region of the long-exposure visible-light image is retained, and wherein the bright regions of the short-exposure visible-light image are not overexposed such that brightness information and chromaticity information of the bright regions are retained.

A third aspect of the present disclosure provides an electronic device, comprising: a memory, configured to store a computer program; and a processor, configured to call the computer program to: obtain a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, wherein bright regions of the short-exposure visible-light image are not overexposed, wherein the long-exposure visible-light image and the long-exposure near-infrared image spatially correspond to each other, and wherein the short-exposure visible-light image and the short-exposure near-infrared image spatially correspond to each other; perform brightness reconstruction on an overexposed region of the long-exposure visible-light image based on the long-exposure near-infrared image, the short-exposure visible-light image, and the short-exposure near-infrared image; perform chromaticity reconstruction on the overexposed region of the long-exposure visible-light image based on the short-exposure visible-light image; and generate the high-dynamic-range image based on the long-exposure visible-light image, and results of the brightness reconstruction and the chromaticity reconstruction for the long-exposure visible-light image.

In one embodiment of the third aspect, the processor is further configured to call the computer program to: obtain a mapping relationship between brightness of the short-exposure visible-light image and near-infrared intensity of the short-exposure near-infrared image as a first mapping relationship; obtain a spatial matching relationship between the long-exposure near-infrared image and the short-exposure near-infrared image; obtain an image block correspondence between the long-exposure visible-light image and the short-exposure visible-light image as a second mapping relationship, based on the spatial matching relationship between the long-exposure near-infrared image and the short-exposure near-infrared image; obtain a mapping relationship between brightness of the long-exposure visible-light image and near-infrared intensity of the long-exposure near-infrared image as a third mapping relationship, based on the first mapping relationship and the second mapping relationship; and reconstruct brightness of the overexposed region of the long-exposure visible-light image based on the third mapping relationship and the near-infrared intensity of the long-exposure near-infrared image.

In the present disclosed method for generating a high-dynamic-range image, brightness reconstruction and chromaticity reconstruction are performed on an overexposed region of a long-exposure visible-light image, and the high-dynamic-range image is generated based on the reconstruction results as well as the long-exposure visible-light image. In the high-dynamic-range image generated in this way, both bright and dark regions can be clearly imaged without ghosting.

DETAILED DESCRIPTION

The embodiments of the present disclosure will be described below. Those skilled can easily understand the advantages and effects of the present disclosure according to contents disclosed by the specification. The present disclosure can also be implemented or applied through other different specific embodiments. Various details in this specification can also be modified or changed based on different viewpoints and applications without departing from the spirit of the present disclosure. It should be noted that the following embodiments and the features of the following embodiments can be combined with each other if no conflict will result.

It should be noted that the drawings provided in this disclosure only illustrate the basic concept of the present disclosure in a schematic way, so the drawings only show the components closely related to the present disclosure. The drawings are not necessarily drawn according to the number, shape, and size of the components in actual implementation; during the actual implementation, the type, quantity, and proportion of each component can be changed as needed, and the components' layout may also be more complicated. In addition, in this document, relationship terms such as "first", "second", etc. are used only to distinguish one entity or operation from another, and do not necessarily require or imply any such actual relationship or sequence between these entities or operations.

High-dynamic-range imaging technology works by taking multiple pictures at different exposure times and merging the information from these images, which results in a compressed dynamic range, allowing for clear display of details in both dark and bright regions.

However, current high-dynamic-range algorithms often assume that the multiple images are perfectly aligned. In real-life scenarios, where cameras may be handheld and objects may be moving, issues such as image misalignment, screen jitter, and object occlusion can occur, and therefore using existing high-dynamic-range algorithms in these situations can result in problems such as ghosting in the merged image, which does not meet practical needs.

The present disclosure provides a solution to the above problems of image misalignment, screen jitter, and object occlusion in long and short-exposure images. It introduces a method for generating a high-dynamic-range image through image HDR fusion enhancement. This method produces high-dynamic-range images where both bright and dark regions are clearly imaged, without any ghosting.

The method for generating a high-dynamic-range image provided by the present disclosure will be detailed below by way of exemplary embodiments with reference to the accompanying drawings.

Figure 1:
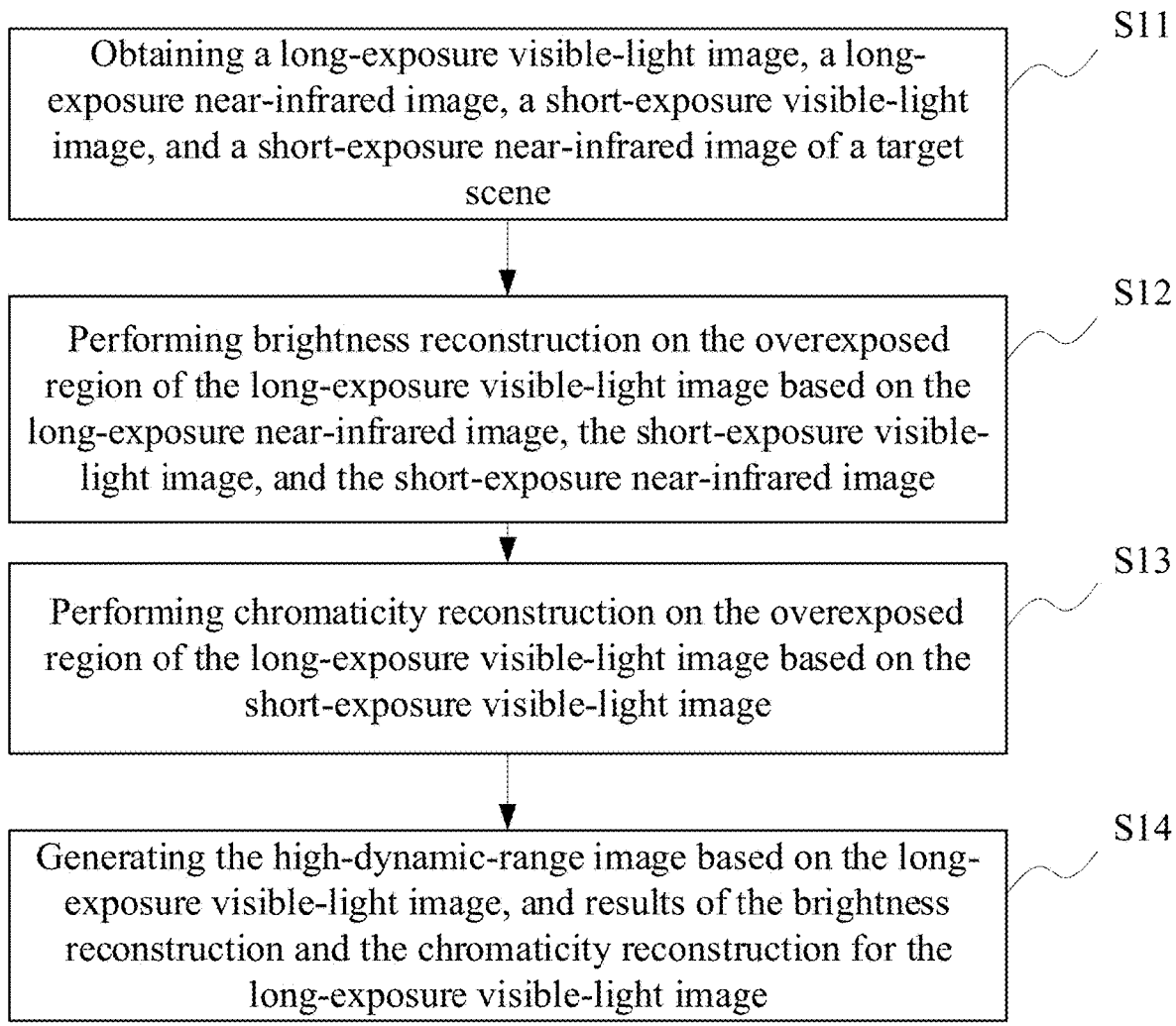
FIG. 1 shows a flowchart of a method for generating a high-dynamic-range image according to an embodiment of the present disclosure.

FIG. 1 shows a flowchart of the method for generating a high-dynamic-range image according to an embodiment of the present disclosure. Each step in this flowchart may be implemented by one or more specific modules. In some embodiments, these modules may be modules in a chip such as a graphics processing unit (GPU), a digital signal processor (DSP), and the like. As shown in FIG. 1, the method for generating a high-dynamic-range image in an embodiment of the present disclosure comprises steps S11 to step S14.

Step S11 includes obtaining a long-exposure visible-light image, a long-exposure near-infrared image, a short-exposure visible-light image, and a short-exposure near-infrared image of a target scene. Specifically, the short-exposure near-infrared image and the long-exposure near-infrared image are not overexposed, and the bright regions of the short-exposure visible-light image are not overexposed. The long-exposure visible-light image and the long-exposure near-infrared image spatially correspond to each other, and the short-exposure visible-light image and the short-exposure near-infrared image spatially correspond to each other. In some embodiments, the long-exposure visible-light image has a same spatial relationship with the long-exposure near-infrared image. In some embodiments, the short-exposure visible-light image has a same spatial relationship with the short-exposure near-infrared image. An exposure time of the long-exposure visible-light image and long-exposure near-infrared image is longer than that of the short-exposure visible-light image and the short-exposure near-infrared image. Since the long-exposure visible-light image has a longer exposure time, the clarity of the dark regions in the long-exposure visible-light image is relatively higher. Ranges of the bright regions and the dark regions may be configured according to actual needs. For example, a region in the short-exposure visible-light image with a brightness greater than a first brightness threshold may be treated as a bright region, and a region in the long-exposure visible-light image with a brightness less than a second brightness threshold may be treated as a dark region, wherein the first brightness threshold and the second brightness threshold may be set according to experience or needs.

In addition, in embodiments of the present disclosure, the long-exposure near-infrared image and the short-exposure near-infrared image are considered to be not overexposed as long as the following conditions are satisfied: information of most regions of the long-exposure near-infrared image and the short-exposure near-infrared image can be captured, and near-infrared image information of regions of the short-exposure near-infrared image and the long-exposure near-infrared image corresponding to an overexposed region of the long-exposure visible-light image is retained. The above definition facilitates finding a spatial matching relationship between long-exposure frames and short-exposure frames, and facilitates reconstructing a gradient of the overexposed region in the long-exposure visible-light image based on a gradient of the near-infrared images. In the present disclosure, the purpose of not overexposing the bright regions in the short-exposure visible-light image is to retain the information of the bright regions in order to calculate a mapping relationship between brightness of the short-exposure visible-light image and near-infrared intensity of the short-exposure near-infrared image in bright regions of the short-exposure scene, and at the same time to retain color information of the bright regions of the short-exposure visible-light image for subsequent chromaticity reconstruction on the overexposed region of the long-exposure visible-light image.

In some embodiments, the long-exposure visible-light image and the long-exposure near-infrared image belong to the same frame of the target scene (i.e., taken at the same time from the same position with the same angle, etc.), and the short-exposure visible-light image and the short-exposure near-infrared image belong to another frame of the target scene.

Step S12 includes performing brightness reconstruction on the overexposed region of the long-exposure visible-light image based on the long-exposure near-infrared image, the short-exposure visible-light image, and the short-exposure near-infrared image.

Step S13 includes performing chromaticity reconstruction on the overexposed region of the long-exposure visible-light image based on the short-exposure visible-light image.

Step S14 includes generating the high-dynamic-range image based on the long-exposure visible-light image, and results of the brightness reconstruction and the chromaticity reconstruction for the long-exposure visible-light image.

As described above, in the method for generating a high-dynamic-range image according to embodiments of the present disclosure, brightness reconstruction and chromaticity reconstruction are performed on the overexposed region of the long-exposure visible-light image, and the high-dynamic-range image is generated based on the reconstruction results as well as the long-exposure visible-light image.

In the high-dynamic-range image generated in this way, both bright and dark regions can be clearly imaged without ghosting.

Figure 2:
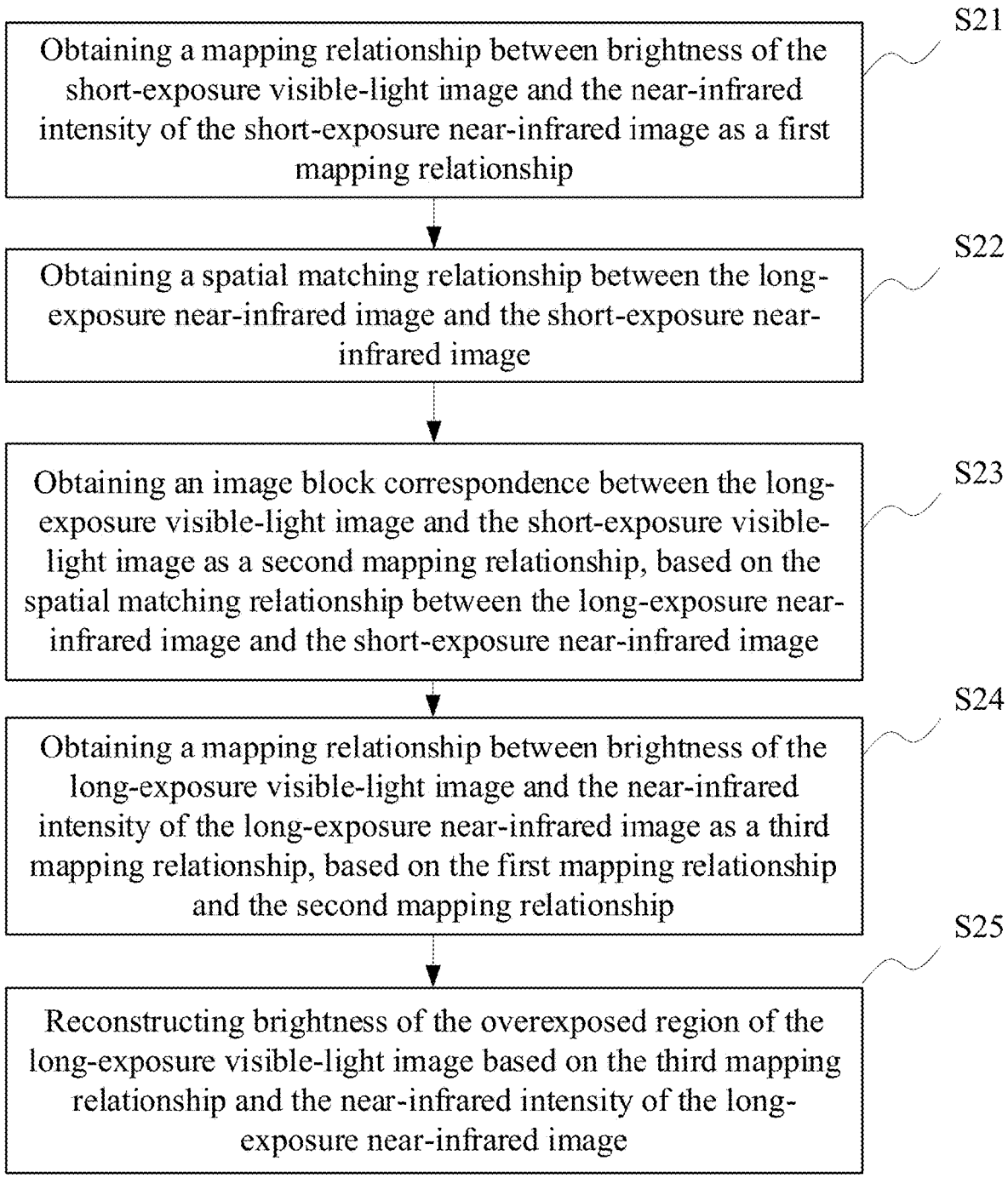
FIG. 2 shows a flowchart of brightness reconstruction according to an embodiment of the present disclosure.

FIG. 2 is a flowchart illustrating brightness reconstruction on the overexposed region of the long-exposure visible-light image according to an embodiment of the present disclosure. As shown in FIG. 2, the brightness reconstruction comprises steps S21 to S25.

Step S21 includes obtaining a mapping relationship between brightness of the short-exposure visible-light image and the near-infrared intensity of the short-exposure near-infrared image as a first mapping relationship. Specifically, pixels in the short-exposure visible-light image correspond one-to-one with pixels in the short-exposure near-infrared image, and for each of the pixels in the short-exposure visible-light image, there is a more specific mapping relationship between brightness of this pixel and infrared intensity of the corresponding pixel in the short-exposure near-infrared image.

Step S22 includes obtaining a spatial matching relationship between the long-exposure near-infrared image and the short-exposure near-infrared image. Since both the short-exposure near-infrared image and the long-exposure near-infrared image are not overexposed, an accurate spatial matching relationship between the long-exposure near-infrared image and the short-exposure near-infrared image can be obtained in step S22.

Step S23 includes obtaining an image block correspondence between the long-exposure visible-light image and the short-exposure visible-light image as a second mapping relationship, based on the spatial matching relationship between the long-exposure near-infrared image and the short-exposure near-infrared image. Since the short-exposure near-infrared image and the short-exposure visible-light image spatially correspond to each other, the long-exposure near-infrared image and the long-exposure visible-light image also spatially correspond to each other. Therefore, according to the spatial matching relationship between the short-exposure near-infrared image and the short-exposure visible-light image, the spatial matching relationship between the long-exposure near-infrared image and the short-exposure near-infrared image, and the spatial matching relationship between the long-exposure near-infrared image and the long-exposure visible-light image, the image block correspondence between the long-exposure visible-light image and the short-exposure visible-light image can be accurately obtained. For example, for an image block $S_0^{vis}$ in the long-exposure visible-light image, an image block $S_0^{nir}$ in the long-exposure near-infrared image at the same relative position as the image block $S_0^{vis}$ is first obtained, then an image block $S_1^{nir}$ in the short-exposure near-infrared image that resembles the image block $S_0^{nir}$ the most is found, and then an image block $S_1^{vis}$ in the short-exposure visible-light image at the same relative position as the image block $S_1^{nir}$ is obtained, which is the image block that matches the image block $S_0^{vis}$.

In some embodiments, in step S23, the degree of matching between two blocks respectively from the long-exposure visible-light image and the short-exposure visible-light image may be determined based on the distance L2 between the two blocks in the visible-light brightness channel.

Step S24 includes obtaining a mapping relationship between brightness of the long-exposure visible-light image and the near-infrared intensity of the long-exposure near-infrared image as a third mapping relationship, based on the first mapping relationship and the second mapping relationship. For example, for the image block $S_1^{vis}$, if its corresponding first mapping relationship is F, the third mapping relationship corresponding to the image block $S_0^{vis}$ that matches the image block $S_1^{vis}$ is also F.

Step S25 includes reconstructing brightness of the overexposed region of the long-exposure visible-light image based on the third mapping relationship and the near-infrared intensity of the long-exposure near-infrared image.

According to an embodiment of the present disclosure, reconstructing the brightness of the overexposed region of the long-exposure visible-light image based on the third mapping relationship and the near-infrared intensity of the long-exposure near-infrared image comprises: according to the third mapping relationship, mapping near-infrared intensity of an overexposed region of the long-exposure near-infrared image to brightness, based on which the brightness of the overexposed region of the long-exposure visible-light image is reconstructed. The overexposed region of the long-exposure near-infrared image corresponds to the overexposed region of the long-exposure visible-light image.

Figure 3:
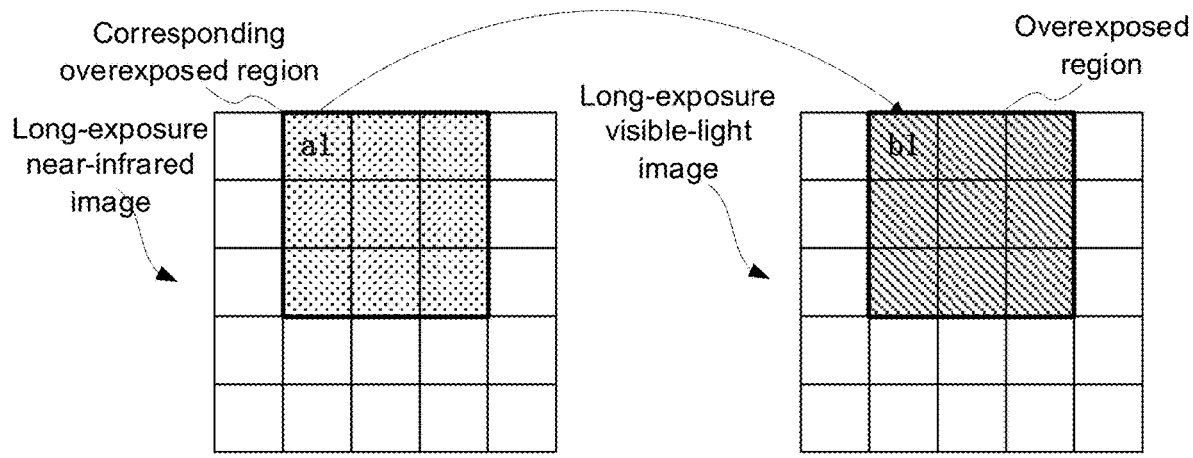
FIG. 3 shows a schematic diagram of brightness reconstruction according to an embodiment of the present disclosure.

FIG. 3 is a schematic diagram illustrating brightness reconstruction on the overexposed region of the long-exposure visible-light image according to an embodiment of the present disclosure. As shown in FIG. 3, the long-exposure near-infrared image and the long-exposure visible-light image have the same dimensions, pixels in the long-exposure near-infrared image correspond one-to-one with pixels in the long-exposure visible-light image, and the overexposed region of the long-exposure near-infrared image has the same relative position and dimensions as those of the overexposed region of the long-exposure visible-light image. Taking the pixel b1 in the long-exposure visible-light image as an example, its corresponding pixel in the long-exposure near-infrared image is a1. During the brightness reconstruction, the brightness of b1 can be replaced by f (N_a1), wherein f is a mapping function corresponding to the third mapping relationship, and N_a1 denotes the near-infrared intensity of the pixel a1. In this way, the visible-light brightness of each pixel in the overexposed region of the long-exposure visible-light image can be replaced with a mapping value of the near-infrared intensity of its corresponding pixel in the long-exposure near-infrared image, so as to complete the brightness reconstruction on the overexposed region of the long-exposure visible-light image.

Figure 4:
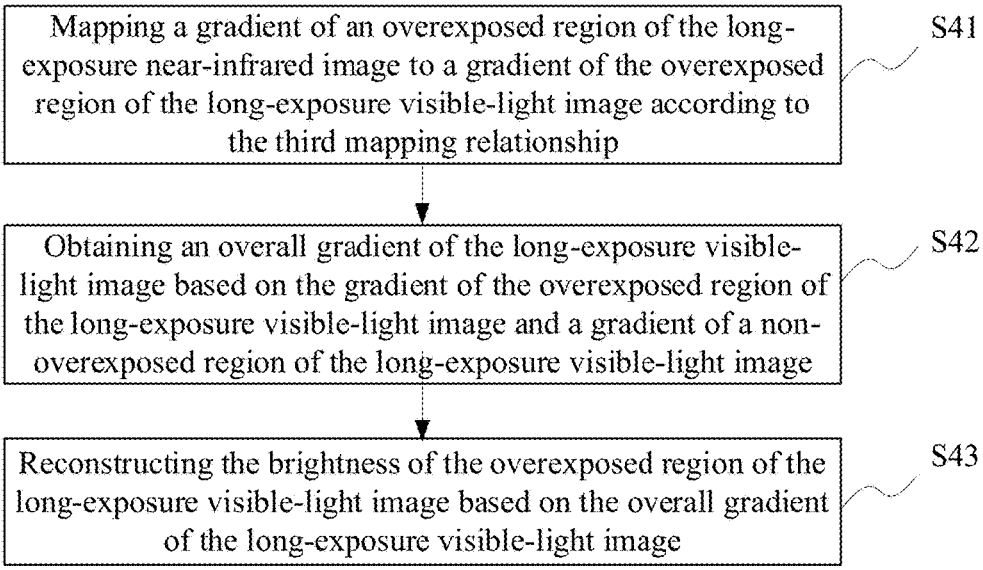
FIG. 4 shows a flowchart of brightness reconstruction according to an embodiment of the present disclosure.

As shown in FIG. 4, according to an embodiment of the present disclosure, reconstructing brightness of the overexposed region of the long-exposure visible-light image based on the third mapping relationship and the near-infrared intensity of the long-exposure near-infrared image comprises steps S41 to S43.

Step S41 includes mapping a gradient of an overexposed region of the long-exposure near-infrared image to a gradient of the overexposed region of the long-exposure visible-light image according to the third mapping relationship, wherein the overexposed region of the long-exposure near-infrared image corresponds to the overexposed region of the long-exposure visible-light image. Taking FIG. 3 as an example, for the pixel b1 in the overexposed region of the long-exposure visible-light image, its gradient is f(G_a1), wherein G_a1 represents the gradient of the pixel a1 in the overexposed region of the long-exposure near-infrared image. The gradient of each pixel in the overexposed region of the long-exposure visible-light image can be reconstructed in this manner.

Step S42 includes obtaining an overall gradient of the long-exposure visible-light image based on the gradient of the overexposed region of the long-exposure visible-light image and a gradient of a non-overexposed region of the long-exposure visible-light image. The gradient of the non-overexposed regions is a gradient of the visible-light brightness channel in the non-exposed region of the long-exposure visible-light image.

Step S43 includes reconstructing the brightness of the overexposed region of the long-exposure visible-light image based on the overall gradient of the long-exposure visible-light image. Specifically, a Poisson image editing algorithm may be utilized in step S43 to recover the brightness of the overexposed region of the visible-light image based on the overall gradient of the long-exposure visible-light image, but the present disclosure is not limited thereto.

In some embodiments, the reconstructed brightness of the overexposed region of the long-exposure visible-light image may be greater than 1. In light of this problem, the method for generating the high-dynamic-range image of the present disclosure may also comprise: compressing the brightness of the overexposed region of the long-exposure visible-light image to the range of 0 to 1. Specifically, the long-exposure visible-light image is normalized, and then pixel values of the visible-light brightness channel of the long-exposure visible-light image are adjusted using the following equation (1):

$$V'_i = \frac{\log\left(\frac{V_i}{V_w} + 1\right)}{\log\left(\frac{V_{max}}{V_w} + 1\right)}. \tag{1}$$

$V'_i$ is an adjusted pixel value of the visible-light brightness channel of an $i_{th}$ pixel in the long-exposure visible-light image, $V_i$ denotes the (original) pixel value of the visible-light brightness channel of the $i_{th}$ pixel, and $V_{max}$ is the maximum pixel value of the visible-light brightness channel of the long-exposure visible-light image, and $V_w$ can be defined by the following equation (2):

$$V_w = \exp\left(\frac{1}{k} \times \sum_{i=1}^{k} \log(\delta + V_i)\right). \tag{2}$$

k is a total number of pixels in the long-exposure visible-light image, and $\delta$ is an extremely small value, and can be configured empirically.

According to the above description, it can be seen that in the present disclosure, the gradient domain of the overexposed region in the long-exposure visible-light image is filled with gradient information, and its brightness is reconstructed by Poisson image editing, and the reconstructed brightness is then compressed, which is conducive to improving the clarity of the high-dynamic range image.

Figure 5A:
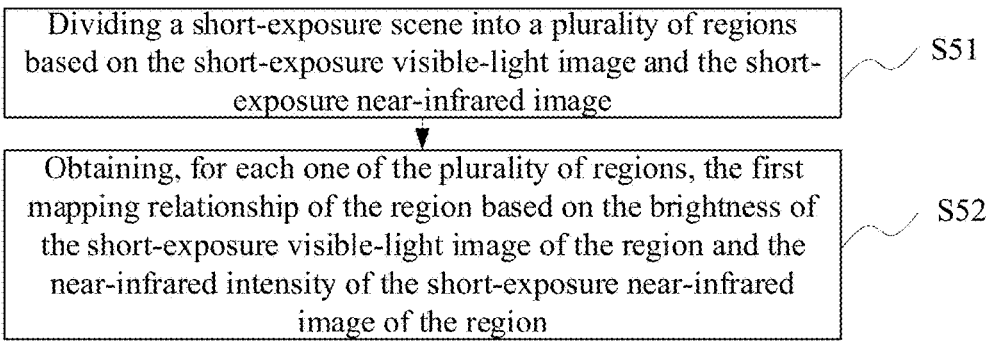
FIG. 5A shows a flowchart of obtaining a first mapping relationship according to an embodiment of the present disclosure.

FIG. 5A is a flowchart of obtaining a mapping relationship between brightness of the short-exposure visible-light image and the near-infrared intensity of the short-exposure near-infrared image as a first mapping relationship according to an embodiment of the present disclosure. As shown in FIG. 5A, in one embodiment, obtaining the first mapping relationship comprises steps S51 and step S52.

Figure 5B:
FIG. 5B shows an exemplary short-exposure visible-light image according to an embodiment of the present disclosure.
Figure 5C:
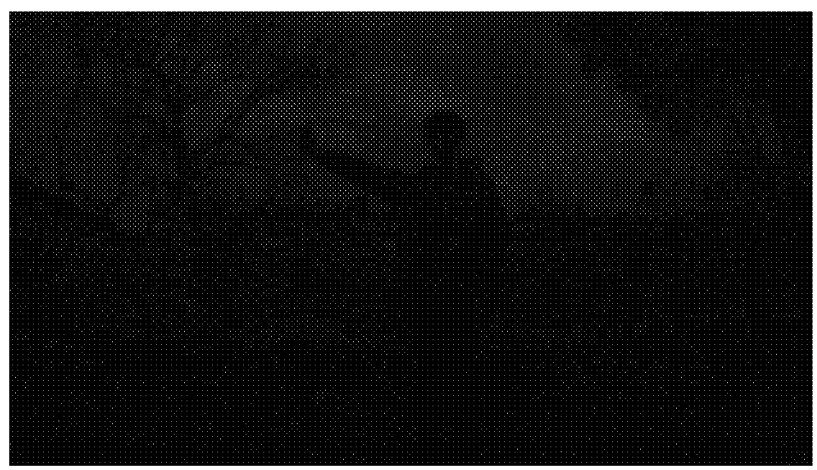
FIG. 5C shows an exemplary short-exposure near-infrared image according to an embodiment of the present disclosure.
Figure 5D:
FIG. 5D shows an exemplary result of dividing a short-exposure scene according to an embodiment of the present disclosure.

Step S51 includes dividing a short-exposure scene into a plurality of regions based on the short-exposure visible-light image and the short-exposure near-infrared image. In some embodiments, the short-exposure scene may be divided in step S51 based on grayscale of pixels in the short-exposure visible-light image and the short-exposure near-infrared image. For example, FIG. 5B and FIG. 5C show an exemplary short-exposure visible-light image and an exemplary short-exposure near-infrared image according to embodiments of the present disclosure, and FIG. 5D shows an exemplary result of dividing the short-exposure scene according to an embodiment of the present disclosure, wherein each unique color of FIG. 5D represents a region.

Step S52 includes obtaining, for each one of the plurality of regions, the first mapping relationship of the region based on the brightness of the short-exposure visible-light image of the region and the near-infrared intensity of the short-exposure near-infrared image of the region.

In some embodiments, for any region A of the short-exposure scene, the first mapping relationship corresponding to the region A may be represented by the following equation (3):

$$V = a \times N + b \tag{3}$$

V denotes a pixel value of the visible-light brightness channel of a pixel in the region A of the short-exposure visible-light image, N denotes a near-infrared intensity of the pixel in the region A of the short-exposure near-infrared image, a and b are mapping parameters, which are dependent on V and N, and can be obtained by fitting. It should be noted that the equation (3) applies to all pixels in the region A. For example, for a pixel b2 in the region A of the short-exposure visible-light image, whose corresponding pixel in the short-exposure near-infrared image is a2, V_b2=a×N_a2+b, wherein V_b2 is a pixel value of the visible-light brightness channel of the pixel b2, and N_a2 is the near-infrared intensity of the pixel a2.

In some embodiments, the mapping parameters a and b may be obtained by the following equations (4) and (5), respectively:

$$a = \frac{\sum_{i=1}^{M} V_i \times N_i - \frac{1}{M} \times \sum_{i=1}^{M} V_i \times \sum_{i=1}^{M} N_i}{\sum_{i=1}^{M} N_i^2 - \frac{1}{M} \times \left(\sum_{i=1}^{M} N_i\right)^2}. \tag{4}$$

$$b = \frac{1}{M} \times \left(\sum_{i=1}^{M} V_i - a \times \sum_{i=1}^{M} N_i\right). \tag{5}$$

M denotes a total number of pixels in the region A of the short-exposure visible-light image, $V_i$ denotes a pixel value of the visible-light brightness channel of an $i_{th}$ pixel in the region A, and $N_i$ denotes the near-infrared intensity of the it pixel's corresponding pixel in the short-exposure near-infrared image.

In some other embodiments, for any region B of the short-exposure scene, the first mapping relationship corresponding to the region B may be represented by the following equation (6):

$$V = a \times N \tag{6}$$

V denotes a pixel value of the visible-light brightness channel of a pixel in the region B in the short-exposure visible-light image, N denotes the near-infrared intensity of the pixel in the region B in the short-exposure near-infrared image, and a is a mapping parameter, which is dependent on V and N, and can be obtained by fitting. In comparison, the second approach only requires one mapping parameter, making it easier to calculate, and therefore requiring less resources for the calculation process.

Figure 6A:
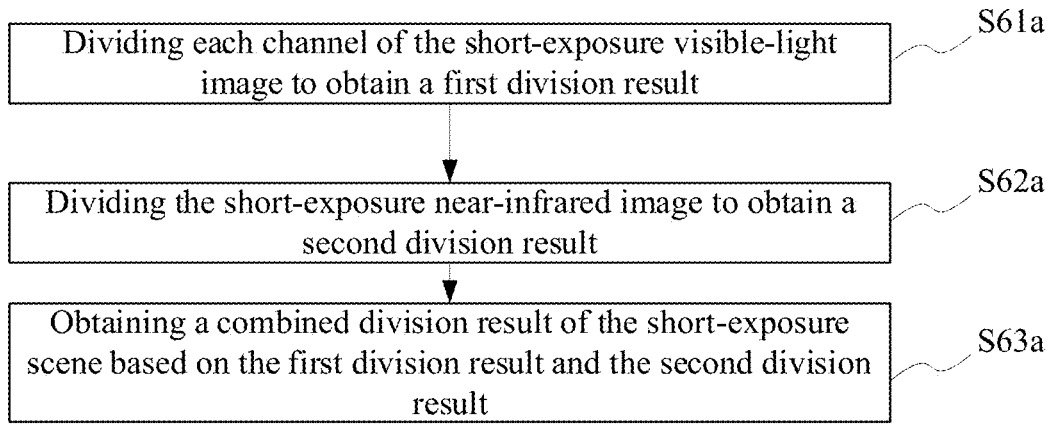
FIG. 6A shows a flowchart of dividing a short-exposure scene according to an embodiment of the present disclosure.

FIG. 6A shows a flowchart of dividing a short-exposure scene into a plurality of regions according to an embodiment of the present disclosure. As shown in FIG. 6A, in one embodiment, dividing the short-exposure scene comprises steps S61a to S63a.

Step S61a includes dividing each channel of the short-exposure visible-light image to obtain a first division result.

Step S62a includes dividing the short-exposure near-infrared image to obtain a second division result.

Step S63a includes obtaining a combined division result of the short-exposure scene based on the first division result and the second division result.

For example, if the short-exposure visible-light image is a short-exposure RGB image, it can be divided as follows: converting the short-exposure RGB image into three channels of H, S, and V, and dividing the H channel, the S channel, the V channel, and the short-exposure near-infrared image in sequence; that is, after the division of the H channel, dividing the S channel according to a division result of the H channel, then dividing the V channel according to a division result of the S channel, and then dividing the short-exposure near-infrared image according to a division result of the V channel, so as to obtain the final division result.

Figure 6B:
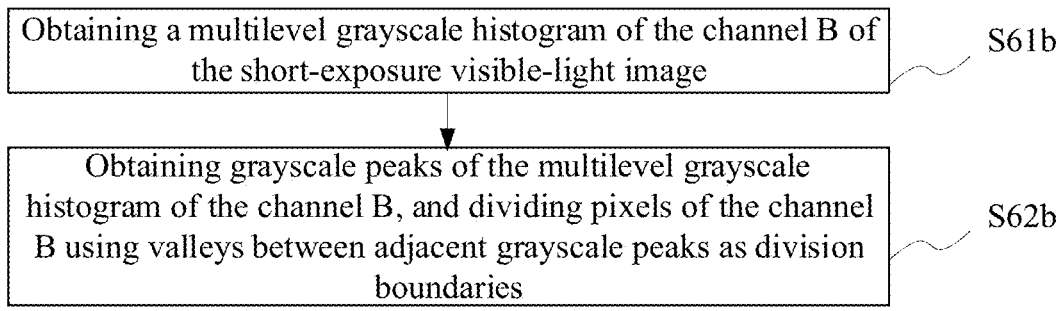
FIG. 6B shows a flowchart of dividing a channel of a short-exposure visible-light image according to an embodiment of the present disclosure.

FIG. 6B shows a flowchart of dividing a channel B of the short-exposure visible-light image according to an embodiment of the present disclosure. As shown in FIG. 6B, in one embodiment, dividing the channel B comprises step S61b and step S62b.

Step S61b includes obtaining a multilevel grayscale histogram of the channel B of the short-exposure visible-light image. For example, a 256-level grayscale histogram of the channel B may be acquired in some embodiments, i.e., a grayscale histogram of levels 0 to 255 is created based on grayscale values of pixels in the channel B.

Step S62b includes obtaining grayscale peaks of the multilevel grayscale histogram of the channel B, and dividing pixels of the channel B using valleys between adjacent grayscale peaks as division boundaries.

Figure 7:
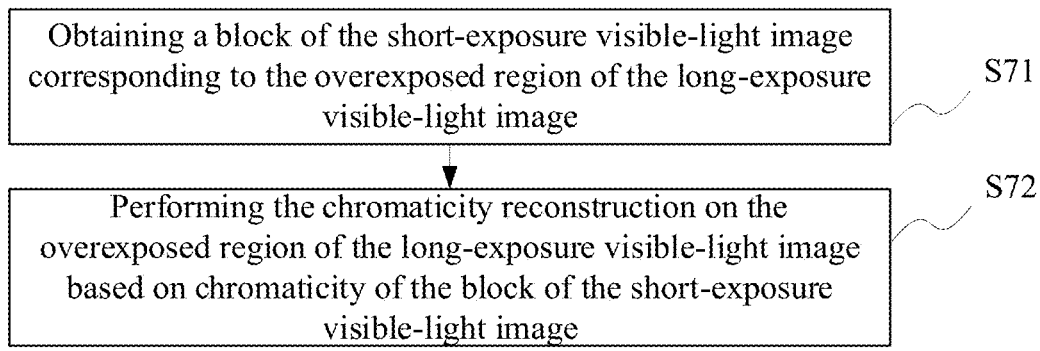
FIG. 7 shows a flowchart of chromaticity reconstruction according to an embodiment of the present disclosure.

FIG. 7 is a flowchart illustrating chromaticity reconstruction on the overexposed region of the long-exposure visible-light image based on the short-exposure visible-light image according to an embodiment of the present disclosure. As shown in FIG. 7, in one embodiment, the chromaticity reconstruction comprises steps S71 and S72.

Step S71 includes obtaining a block of the short-exposure visible-light image corresponding to the overexposed region of the long-exposure visible-light image.

Step S72 includes performing the chromaticity reconstruction on the overexposed region of the long-exposure visible-light image based on chromaticity of the block of the short-exposure visible-light image. For example, the chromaticity of the corresponding block may be used to replace the chromaticity of the overexposed region of the long-exposure visible-light image in step S72.

In some embodiments, after the chromaticity reconstruction on the overexposed region of the long-exposure visible-light image, the chromaticity channel of the long-exposure visible-light image may also be smoothed using a guided filter.

Figures 8A, 8B, 8C:
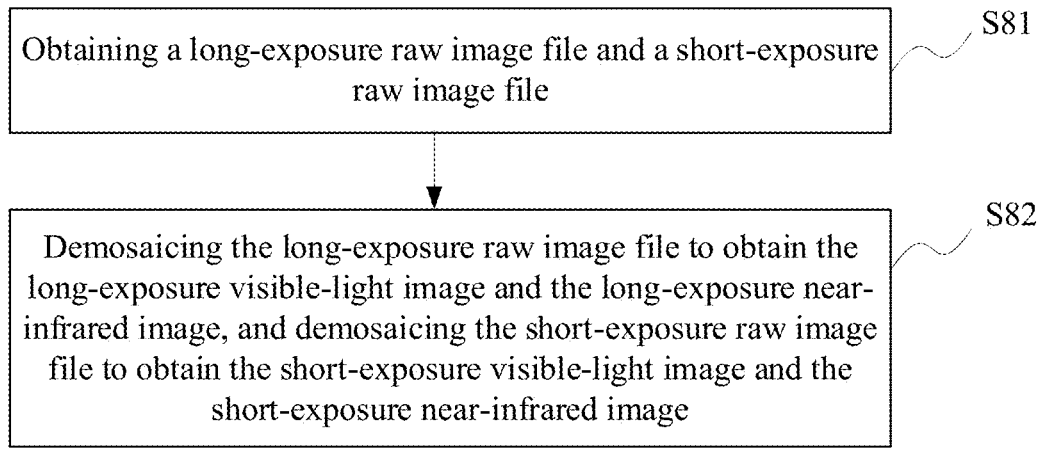
FIG. 8A shows a flowchart of obtaining a short-exposure visible-light image and a short-exposure near-infrared image according to an embodiment of the present disclosure.
FIG. 8B and FIG. 8C are schematic diagrams showing two exemplary arrays of image acquisition devices according to embodiments of the present disclosure.

FIG. 8A is a flowchart of obtaining the long-exposure visible-light image, the long-exposure near-infrared image, the short-exposure visible-light image, and the short-exposure near-infrared image according to one embodiment of the present disclosure. As shown in FIG. 8A, in one embodiment, obtaining the above-described images comprises steps S81 and S82.

Step S81 includes obtaining a long-exposure raw image file and a short-exposure raw image file, wherein the long-exposure raw image file and the short-exposure raw image file are acquired by an image acquisition device using different exposure parameters for the target scene. The long-exposure raw image file may be a raw format file acquired by the image acquisition device with a long exposure time, such as 8 ms, and the short-exposure raw image file may be a raw format file acquired by the image acquisition device with a short exposure time, such as 2 ms.

Step S82 includes demosaicing the long-exposure raw image file to obtain the long-exposure visible-light image and the long-exposure near-infrared image, and demosaicing the short-exposure raw image file to obtain the short-exposure visible-light image and the short-exposure near-infrared image.

Next, the demosaicing process will be described in detail using a long-exposure raw image file containing R, G, B, and NIR channels as an example. It should be noted that the channels of the long-exposure raw image file of the present disclosure are not limited to R, G, B and NIR.

In some embodiments, the R, G, B, and NIR channels of the long-exposure raw image file may be extracted and interpolated to obtain a long-exposure visible-light image and a long-exposure near-infrared image, respectively. Specifically, the NIR channel can be extracted to synthesize a single-channel image with a resolution of [W/2, H/2], which is the long-exposure near-infrared image, wherein W and H are the width and height of the long-exposure raw image file, respectively. After averaging the G channel, the R, G, and B channels are recombined into a common Bayer raw image with a resolution of [W/2, H/2]. This Bayer raw image is demosaiced to obtain an RGB color image, i.e., the long-exposure visible-light image.

In some embodiments, the long-exposure raw image file may also be processed to obtain the long-exposure visible-light image and the long-exposure near-infrared image in the following manner. Specifically, the R, G, and B channels are recombined into a common Bayer raw image, which is then demosaiced to obtain a reduced-resolution RGB color image. The NIR channel is interpolated to obtain a full-resolution NIR single-channel image, which is the long-exposure near-infrared image. A full-resolution RGB color image, which is the long-exposure visible-light image, can be obtained by fusing the reduced-resolution RGB color image and the full-resolution NIR single-channel image.

In addition, a similar method may be used in some embodiments to demosaic the short-exposure raw image file to obtain the short-exposure visible-light image and the short-exposure near-infrared image.

In some embodiments, the method for generating the high-dynamic-range image may further comprise: adjusting the exposure parameters of the image acquisition device so that the short-exposure visible-light image and the long-exposure near-infrared image are not overexposed, and so that the bright regions of the short-exposure visible-light image are not overexposed. Specifically, after obtaining the long-exposure visible-light image, the long-exposure near-infrared image, the short-exposure visible-light image, and the short-exposure near-infrared image, it is determined whether the four images satisfy preset conditions. If the preset conditions are not satisfied, the exposure parameters of the image acquisition device are adjusted and the long-exposure raw image file and the short-exposure raw image file are reacquired until the acquired long-exposure visible-light image, the long-exposure near-infrared image, the short-exposure visible-light image, and the short-exposure near-infrared image satisfy the preset conditions. The preset conditions may comprise, for example, that the short-exposure visible-light image and the long-exposure near-infrared image are not overexposed, that the bright regions of the short-exposure visible-light image are not overexposed, and that dark regions of the long-exposure visible-light image are imaged clearly.

In some embodiments, an array of the image acquisition device comprises four channels, R, G, B, and NIR, and spatial relationships between the RGB channels and the NIR channel in the same frame of the scene acquired by the image acquisition device are basically the same. FIG. 8B and FIG. 8C illustrate two exemplary arrangements of the array of image acquisition devices according to embodiments of the present disclosure It should be noted that, in the present disclosure, acquisition methods of the long-exposure visible-light image, the long-exposure near-infrared image, the short-exposure visible-light image, and the short-exposure near-infrared image are not limited to the above-mentioned manners. For example, in some embodiments these images may be acquired in real time by the above-described image acquisition device(s) or some similar devices. In some other embodiments, the visible-light images and near-infrared images that satisfy the preset conditions and have consistent spatial relationships under long and short-exposures may be provided by some other devices. In addition, the image acquisition device may be a separate acquisition device or may be part of an execution body of the method for generating the high-dynamic-range image according to embodiments of the present disclosure; that is, the image acquisition device and the electronic device for executing the method of the present disclosure may be the same device or may be different devices. When qualified visible-light images and near-infrared images are provided by some other devices, they may be subsequently demosaiced according to specific array arrangements of the corresponding original files.

Figure 9:
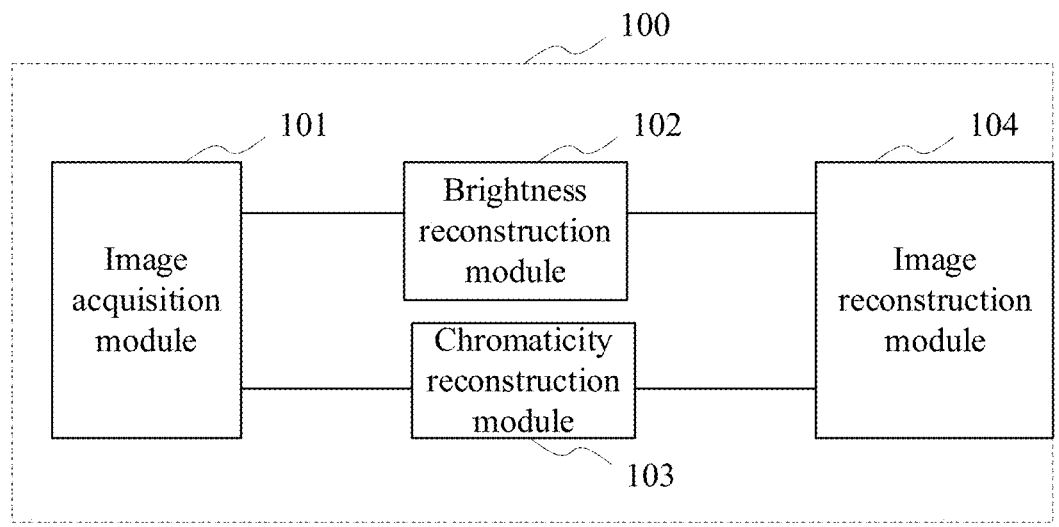
FIG. 9 shows a block diagram of an apparatus for generating a high-dynamic-range image according to an embodiment of the present disclosure.

The present disclosure also provides an apparatus for generating a high-dynamic-range image. FIG. 9 is a block diagram of the apparatus for generating a high-dynamic-range image according to embodiments of the present disclosure. As shown in FIG. 9, the apparatus 100 provided by the embodiments of the present disclosure comprises an image acquisition module 101, a brightness reconstruction module 102, a chromaticity reconstruction module 103, and an image reconstruction module 104. The image acquisition module 101 is configured to obtain a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, wherein bright regions of the short-exposure visible-light image are not overexposed, the long-exposure visible-light image and the long-exposure near-infrared image spatially correspond to each other, wherein the short-exposure visible-light image and the short-exposure near-infrared image spatially correspond to each other. The brightness reconstruction module 102 is configured to perform brightness reconstruction on an overexposed region of the long-exposure visible-light image based on the long-exposure near-infrared image, the short-exposure visible-light image, and the short-exposure near-infrared image. The chromaticity reconstruction module 103 is configured to perform chromaticity reconstruction on the overexposed region of the long-exposure visible-light image based on the short-exposure visible-light image. The image reconstruction module 104 is configured to generate the high-dynamic-range image based on the long-exposure visible-light image, and results of the brightness reconstruction and the chromaticity reconstruction for the long-exposure visible-light image.

It is to be noted that, in some embodiments, the modules in the apparatus 100 for generating the high-dynamic-range image may correspond to steps S11 to S14 of the method for generating the high-dynamic-range image shown in FIG. 1.

In some embodiments, the brightness reconstruction module is configured to: obtain a mapping relationship between brightness of the short-exposure visible-light image and near-infrared intensity of the short-exposure near-infrared image as a first mapping relationship; obtain a spatial matching relationship between the long-exposure near-infrared image and the short-exposure near-infrared image; obtain an image block correspondence between the long-exposure visible-light image and the short-exposure visible-light image as a second mapping relationship, based on the spatial matching relationship between the long-exposure near-infrared image and the short-exposure near-infrared image; obtain a mapping relationship between brightness of the long-exposure visible-light image and near-infrared intensity of the long-exposure near-infrared image as a third mapping relationship, based on the first mapping relationship and the second mapping relationship; and reconstruct brightness of the overexposed region of the long-exposure visible-light image based on the third mapping relationship and the near-infrared intensity of the long-exposure near-infrared image.

In some embodiments, the chromaticity reconstruction module is configured to: obtain a block of the short-exposure visible-light image corresponding to the overexposed region of the long-exposure visible-light image; and perform the chromaticity reconstruction on the overexposed region of the long-exposure visible-light image based on chromaticity of the block of the short-exposure visible-light image.

In some embodiments, the image acquisition module is configured to: obtain a long-exposure raw image file and a short-exposure raw image file, wherein the long-exposure raw image file and the short-exposure raw image file are acquired by an image acquisition device using different exposure parameters for the target scene; and perform a demosaic on the long-exposure raw image file to obtain the long-exposure visible-light image and the long-exposure near-infrared image, and perform a demosaic on the short-exposure raw image file to obtain the short-exposure visible-light image and the short-exposure near-infrared image.

In some embodiments, the image acquisition module is further configured to: adjust the exposure parameters of the image acquisition device so that the short-exposure visible-light image and the long-exposure near-infrared image are not overexposed, and so that the bright regions of the short-exposure visible-light image are not overexposed, wherein the short-exposure near-infrared image and the long-exposure near-infrared image are not overexposed, such that information of most regions of the short-exposure near-infrared image and most regions of the long-exposure near-infrared image is capable of being captured, and such that near-infrared image information of regions of the short-exposure near-infrared image and the long-exposure near-infrared image corresponding to the overexposed region of the long-exposure visible-light image is retained, and wherein the bright regions of the short-exposure visible-light image are not overexposed such that brightness information and chromaticity information of the bright regions are retained The present disclosure also provides a non-transitory computer-readable storage medium storing a computer program. The computer program can be executed to implement a method for generating a high-dynamic-range image according to any embodiment of the present disclosure.

One or more storage media may be used in some embodiments in the present disclosure. The storage medium may be a computer-readable signal medium or a computer-readable storage medium. The computer-readable storage medium may comprise, but is not limited to, one or more of an electrical, magnetic, optical, electromagnetic, infrared, or semiconductor system, apparatus, and component. A non-exhaustive list of specific examples of the computer-readable storage medium is as follows: an electrical connection having one or more wires, a portable computer disk, a hard disk, a random-access memory (RAM), a read-only memory (ROM), an erasable programmable read-only memory (EPROM), an optical fiber, a portable compact disk read-only memory (CD-ROM), an optical storage device, a magnetic storage device, and any suitable combination of the above. Herein, the computer-readable storage medium may be any tangible medium containing or storing a program that may be used by or in combination with an instruction execution system, apparatus, or component.

Figure 10:
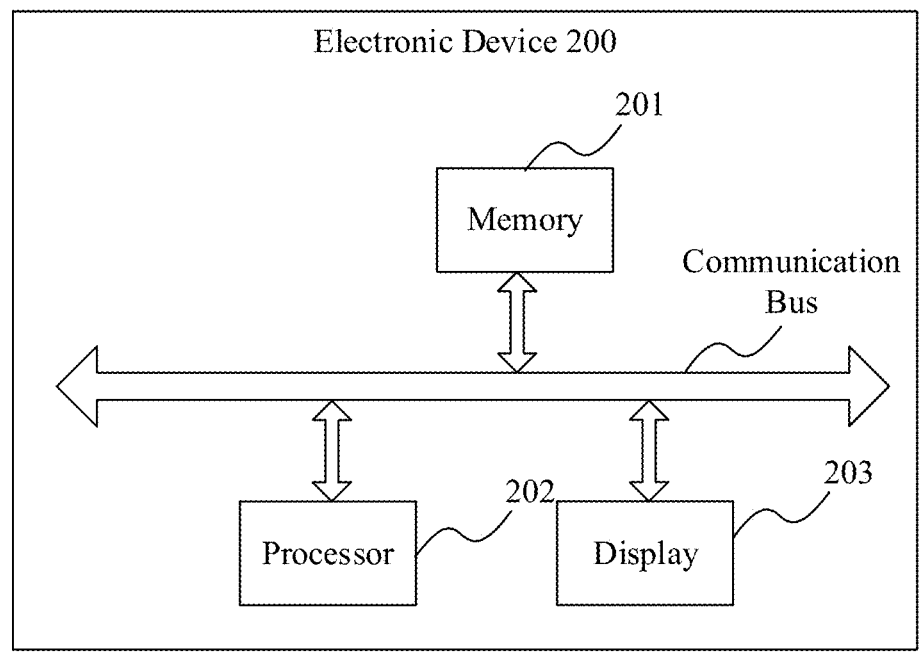
FIG. 10 shows a block diagram of an electronic device according to an embodiment of the present disclosure.

The present disclosure also provides an electronic device. FIG. 10 shows a block diagram of the electronic device 200 according to an embodiment of the present disclosure. As shown in FIG. 10, the electronic device 200 comprises a memory 201 and a processor 202.

The memory 201 is configured to store a computer program. In some embodiments, the memory 201 comprises one or more of a ROM, a RAM, a magnetic disk, a flash disk, a memory card, an optical disk, and other non-transitory medium that can store program codes.

Specifically, the memory 201 may comprise computer-readable media in the form of volatile memory, such as a RAM and/or a cache memory. The electronic device 200 may further comprise other removable or non-removable, volatile or non-volatile computer system storage media. The memory 201 may comprise at least one software product having one or more program modules configured to perform functions of the embodiments of the present disclosure.

The processor 202 is connected to the memory 201 and is configured to execute the computer program stored in the memory 201 to cause the electronic device 200 to: obtain a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, wherein bright regions of the short-exposure visible-light image are not overexposed, wherein the long-exposure visible-light image and the long-exposure near-infrared image spatially correspond to each other, and wherein the short-exposure visible-light image and the short-exposure near-infrared image spatially correspond to each other; perform brightness reconstruction on an overexposed region of the long-exposure visible-light image based on the long-exposure near-infrared image, the short-exposure visible-light image, and the short-exposure near-infrared image; perform chromaticity reconstruction on the overexposed region of the long-exposure visible-light image based on the short-exposure visible-light image; and generate the high-dynamic-range image based on the long-exposure visible-light image, and results of the brightness reconstruction and the chromaticity reconstruction for the long-exposure visible-light image.

In some embodiments, the processor is further configured to call the computer program to: obtain a mapping relationship between brightness of the short-exposure visible-light image and near-infrared intensity of the short-exposure near-infrared image as a first mapping relationship; obtain a spatial matching relationship between the long-exposure near-infrared image and the short-exposure near-infrared image; obtain an image block correspondence between the long-exposure visible-light image and the short-exposure visible-light image as a second mapping relationship, based on the spatial matching relationship between the long-exposure near-infrared image and the short-exposure near-infrared image; obtain a mapping relationship between brightness of the long-exposure visible-light image and near-infrared intensity of the long-exposure near-infrared image as a third mapping relationship, based on the first mapping relationship and the second mapping relationship; and reconstruct brightness of the overexposed region of the long-exposure visible-light image based on the third mapping relationship and the near-infrared intensity of the long-exposure near-infrared image.

In some embodiments, the processor 202 may be a general processor, such as a central processing unit (CPU), a network processor (NP), and the like. The processor 202 may also be a digital signal processor (DSP), an application specific integrated circuit (ASIC), a field-programmable gate array (FPGA), or other programmable logic devices, discrete gate or transistor logic devices, or discrete hardware components.

In some embodiments, the electronic device 200 may also comprise a display 203. The display 203 is communicatively connected to the memory 201 and the processor 202, and is for displaying a graphical user interface associated with the method for generating a high-dynamic-range image.

The scope of the method for generating a high-dynamic-range image is not restricted by the specific sequence of operations listed herein. Any scheme realized by adding or subtracting operations or replacing operations of the traditional techniques according to the principle of the present disclosure is comprised in the scope of the present disclosure.

The present disclosure also provides a device for generating a high-dynamic-range image, the device may realize the method for generating a high-dynamic-range image as described in the present disclosure, but devices capable of realizing the method do not necessarily have the same structure as this specific device, and any device obtained by structural changes or displacement based on the principle of the present disclosure is comprised in the scope of the present disclosure.

In summary, in the method for generating a high-dynamic-range image of the present disclosure, brightness reconstruction and chromaticity reconstruction are performed on the overexposed region of the long-exposure visible-light image, and the high-dynamic-range image is generated based on the reconstruction results as well as the long-exposure visible-light image. In the high-dynamic-range image generated in this way, both bright and dark regions can be clearly imaged without ghosting. Therefore, the present disclosure effectively overcomes various shortcomings of the prior art and has a high industrial value.

The above-mentioned embodiments are merely illustrative of the principle and effects of the present disclosure instead of restricting the scope of the present disclosure. Those skilled in the art can make modifications or changes to the above-mentioned embodiments without going against the spirit and the range of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A method for generating a high-dynamic-range image, comprising:
obtaining a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, wherein bright regions of the short-exposure visible-light image are not overexposed, wherein the long-exposure visible-light image and the long-exposure near-infrared image spatially correspond to each other, and wherein the short-exposure visible-light image and the short-exposure near-infrared image spatially correspond to each other;
performing brightness reconstruction on an overexposed region of the long-exposure visible-light image based on the long-exposure near-infrared image, the short-exposure visible-light image, and the short-exposure near-infrared image;
performing chromaticity reconstruction on the overexposed region of the long-exposure visible-light image based on the short-exposure visible-light image; and
generating the high-dynamic-range image based on the long-exposure visible-light image, and results of the brightness reconstruction and the chromaticity reconstruction for the long-exposure visible-light image.

2. The method of claim 1, wherein performing brightness reconstruction on an overexposed region of the long-exposure visible-light image based on the long-exposure near-infrared image, the short-exposure visible-light image, and the short-exposure near-infrared image comprises:
obtaining a mapping relationship between brightness of the short-exposure visible-light image and near-infrared intensity of the short-exposure near-infrared image as a first mapping relationship;
obtaining a spatial matching relationship between the long-exposure near-infrared image and the short-exposure near-infrared image;
obtaining an image block correspondence between the long-exposure visible-light image and the short-exposure visible-light image as a second mapping relationship, based on the spatial matching relationship between the long-exposure near-infrared image and the short-exposure near-infrared image;
obtaining a mapping relationship between brightness of the long-exposure visible-light image and near-infrared intensity of the long-exposure near-infrared image as a third mapping relationship, based on the first mapping relationship and the second mapping relationship; and
reconstructing brightness of the overexposed region of the long-exposure visible-light image based on the third mapping relationship and the near-infrared intensity of the long-exposure near-infrared image.

3. The method of claim 2, wherein reconstructing the brightness of the overexposed region of the long-exposure visible-light image comprises:
mapping a gradient of an overexposed region of the long-exposure near-infrared image to a gradient of the overexposed region of the long-exposure visible-light image based on the third mapping relationship, wherein the overexposed region of the long-exposure near-infrared image corresponds to the overexposed region of the long-exposure visible-light image;
obtaining an overall gradient of the long-exposure visible-light image based on the gradient of the overexposed region of the long-exposure visible-light image and a gradient of a non-overexposed region of the long-exposure visible-light image; and
reconstructing the brightness of the overexposed region of the long-exposure visible-light image based on the overall gradient of the long-exposure visible-light image.

4. The method of claim 2, wherein obtaining a mapping relationship between brightness of the short-exposure visible-light image and near-infrared intensity of the short-exposure near-infrared image as a first mapping relationship comprises:
dividing a short-exposure scene into a plurality of regions based on the short-exposure visible-light image and the short-exposure near-infrared image; and
obtaining, for each one of the plurality of regions, the first mapping relationship of the region based on the brightness of the short-exposure visible-light image of the region and the near-infrared intensity of the short-exposure near-infrared image of the region.

5. The method of claim 4, wherein for each one of the plurality of regions, the first mapping relationship corresponding to the region is given by: $V=a \times N+b$, wherein V denotes visible-light brightness of a pixel in the region, N denotes near-infrared intensity of the pixel in the region, a and b are mapping parameters dependent on V and N.

6. The method of claim 4, wherein for each one of the plurality of regions, the first mapping relationship corresponding to the region is given by: $V=a \times N$, wherein V denotes visible-light brightness of a pixel in the region, N denotes near-infrared intensity of the pixel in the region, and a is a mapping parameter, and wherein the mapping parameter is dependent on V and N.

7. The method of claim 4, wherein dividing a short-exposure scene into a plurality of regions comprises:
dividing each channel of the short-exposure visible-light image to obtain a first division result;
dividing the short-exposure near-infrared image to obtain a second division result; and
obtaining a combined division result of the short-exposure scene based on the first division result and the second division result.

8. The method of claim 7, wherein dividing each channel of the short-exposure visible-light image comprises:
obtaining a multilevel grayscale histogram of each channel of the short-exposure visible-light image; and
obtaining grayscale peaks of the multilevel grayscale histogram of the channel, and dividing pixels of the channel using valleys between adjacent grayscale peaks as division boundaries.

9. The method of claim 1, wherein performing chromaticity reconstruction on an overexposed region of the long-exposure visible-light image based on the short-exposure visible-light image comprises:
obtaining a block of the short-exposure visible-light image corresponding to the overexposed region of the long-exposure visible-light image; and
performing the chromaticity reconstruction on the overexposed region of the long-exposure visible-light image based on chromaticity of the block of the short-exposure visible-light image.

10. The method of claim 1, wherein obtaining the long-exposure visible-light image, the long-exposure near-infrared image, the short-exposure visible-light image, and the short-exposure near-infrared image comprises:

obtaining a long-exposure raw image file and a short-exposure raw image file, wherein the long-exposure raw image file and the short-exposure raw image file are acquired by an image acquisition device using different exposure parameters for the target scene; and demosaicing the long-exposure raw image file to obtain the long-exposure visible-light image and the long-exposure near-infrared image, and demosaicing the short-exposure raw image file to obtain the short-exposure visible-light image and the short-exposure near-infrared image.

11. The method of claim 10, further comprising: adjusting the exposure parameters of the image acquisition device so that the short-exposure visible-light image and the long-exposure near-infrared image are not overexposed, and so that the bright regions of the short-exposure visible-light image are not overexposed.

12. The method of claim 1, wherein the short-exposure near-infrared image and the long-exposure near-infrared image are not overexposed, such that information of most regions of the short-exposure near-infrared image and most regions of the long-exposure near-infrared image is capable of being captured, and such that near-infrared image information of regions of the short-exposure near-infrared image and the long-exposure near-infrared image corresponding to the overexposed region of the long-exposure visible-light image is retained;

wherein the bright regions of the short-exposure visible-light image are not overexposed such that brightness information and chromaticity information of the bright regions are retained.

13. The method of claim 1, wherein the long-exposure visible-light image has a same spatial relationship with the long-exposure near-infrared image, and wherein the short-exposure visible-light image has a same spatial relationship with the short-exposure near-infrared image.

14. An apparatus for generating a high-dynamic-range image, comprising:

an image acquisition module, configured to obtain a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, wherein bright regions of the short-exposure visible-light image are not overexposed, wherein the long-exposure visible-light image and the long-exposure near-infrared image spatially correspond to each other, and wherein the short-exposure visible-light image and the short-exposure near-infrared image spatially correspond to each other;

a brightness reconstruction module, configured to perform brightness reconstruction on an overexposed region of the long-exposure visible-light image based on the long-exposure near-infrared image, the short-exposure visible-light image, and the short-exposure near-infrared image;

a chromaticity reconstruction module, configured to perform chromaticity reconstruction on the overexposed region of the long-exposure visible-light image based on the short-exposure visible-light image; and an image reconstruction module, configured to generate the high-dynamic-range image based on the long-exposure visible-light image, and results of the brightness reconstruction and the chromaticity reconstruction for the long-exposure visible-light image.

15. The apparatus of claim 14, wherein the brightness reconstruction module is configured to:

obtain a mapping relationship between brightness of the short-exposure visible-light image and near-infrared intensity of the short-exposure near-infrared image as a first mapping relationship;

obtain a spatial matching relationship between the long-exposure near-infrared image and the short-exposure near-infrared image;

obtain an image block correspondence between the long-exposure visible-light image and the short-exposure visible-light image as a second mapping relationship, based on the spatial matching relationship between the long-exposure near-infrared image and the short-exposure near-infrared image;

obtain a mapping relationship between brightness of the long-exposure visible-light image and near-infrared intensity of the long-exposure near-infrared image as a third mapping relationship, based on the first mapping relationship and the second mapping relationship; and reconstruct brightness of the overexposed region of the long-exposure visible-light image based on the third mapping relationship and the near-infrared intensity of the long-exposure near-infrared image.

16. The apparatus of claim 14, wherein the chromaticity reconstruction module is configured to:

obtain a block of the short-exposure visible-light image corresponding to the overexposed region of the long-exposure visible-light image; and perform the chromaticity reconstruction on the overexposed region of the long-exposure visible-light image based on chromaticity of the block of the short-exposure visible-light image.

17. The apparatus of claim 14, wherein the image acquisition module is configured to:

obtain a long-exposure raw image file and a short-exposure raw image file, wherein the long-exposure raw image file and the short-exposure raw image file are acquired by an image acquisition device using different exposure parameters for the target scene; and perform a demosaic on the long-exposure raw image file to obtain the long-exposure visible-light image and the long-exposure near-infrared image, and perform a demosaic on the short-exposure raw image file to obtain the short-exposure visible-light image and the short-exposure near-infrared image.

18. The apparatus of claim 17, wherein the image acquisition module is further configured to:

adjust the exposure parameters of the image acquisition device so that the short-exposure visible-light image and the long-exposure near-infrared image are not overexposed, and so that the bright regions of the short-exposure visible-light image are not overexposed, wherein the short-exposure near-infrared image and the long-exposure near-infrared image are not overexposed, such that information of most regions of the short-exposure near-infrared image and most regions of the long-exposure near-infrared image is capable of being captured, and such that near-infrared image information of regions of the short-exposure near-infrared image and the long-exposure near-infrared image corresponding to the overexposed region of the long-exposure visible-light image is retained, and wherein the bright regions of the short-exposure visible-light image are not overexposed such that brightness information and chromaticity information of the bright regions are retained.

19. An electronic device, comprising:
a memory, configured to store a computer program; and
a processor, configured to call the computer program to:
obtain a long-exposure visible-light image, a long-exposure near-infrared image, a short-exposure visible-light image, and a short-exposure near-infrared image of a target scene, wherein the short-exposure near-infrared image and the long-exposure near-infrared image are not overexposed, wherein bright regions of the short-exposure visible-light image are not overexposed, wherein the long-exposure visible-light image and the long-exposure near-infrared image spatially correspond to each other, and wherein the short-exposure visible-light image and the short-exposure near-infrared image spatially correspond to each other;
perform brightness reconstruction on an overexposed region of the long-exposure visible-light image based on the long-exposure near-infrared image, the short-exposure visible-light image, and the short-exposure near-infrared image;
perform chromaticity reconstruction on the overexposed region of the long-exposure visible-light image based on the short-exposure visible-light image; and
generate the high-dynamic-range image based on the long-exposure visible-light image, and results of the brightness reconstruction and the chromaticity reconstruction for the long-exposure visible-light image.

20. The electronic device of claim 19, wherein the processor is further configured to call the computer program to:
obtain a mapping relationship between brightness of the short-exposure visible-light image and near-infrared intensity of the short-exposure near-infrared image as a first mapping relationship;
obtain a spatial matching relationship between the long-exposure near-infrared image and the short-exposure near-infrared image;
obtain an image block correspondence between the long-exposure visible-light image and the short-exposure visible-light image as a second mapping relationship, based on the spatial matching relationship between the long-exposure near-infrared image and the short-exposure near-infrared image;
obtain a mapping relationship between brightness of the long-exposure visible-light image and near-infrared intensity of the long-exposure near-infrared image as a third mapping relationship, based on the first mapping relationship and the second mapping relationship; and
reconstruct brightness of the overexposed region of the long-exposure visible-light image based on the third mapping relationship and the near-infrared intensity of the long-exposure near-infrared image.

* * * * *